Inventor:
Ferdy Mayer
By: Spencer & Kaye
Attorneys

United States Patent Office 3,467,890
Patented Sept. 16, 1969

3,467,890
ELECTRICAL CIRCUIT PROTECTION DEVICES UTILIZING CAPACITOR DISCHARGE
Ferdy Mayer, 22 Rue Ampere, Grenoble, France
Filed June 14, 1965, Ser. No. 463,684
Claims priority, application France, June 20, 1964, 979,070
Int. Cl. H02h 7/00, 7/16, 1/04
U.S. Cl. 317—33                                    5 Claims

ABSTRACT OF THE DISCLOSURE

A circuit protection device including a circuit breaker connected between the electrical circuit to be protected and its power source for disconnecting the circuit from its source when the circuit becomes overloaded, the device further including a current transformer connected to the circuit for monitoring the current supplied thereto, an energy storage element connected to the output of the current transformer for storing the energy supplied by the transformer, a threshold switch connected to the storage element, and a relay having its energising coil connected to the threshold switch and arranged to trigger the circuit breaker when an overload appears in the electric circuit to be protected, the energising coil of the relay receiving all of its energising power from the storage element.

---

Figure 1:
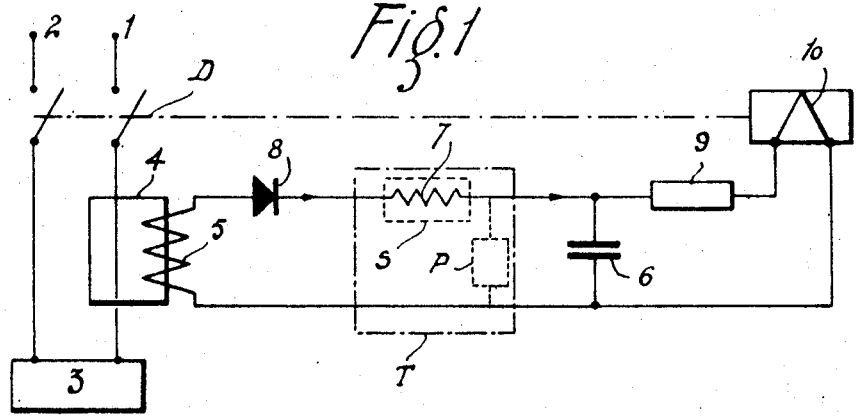

This invention relates to electrical circuit protection devices.

The purpose of electrical circuit breakers is to cause the opening of a circuit to be protected, when the current traversing the circuit reaches an unacceptable value, and this opening of the circuit is effected the more rapidly, the greater the overload.

In order to cause the circuit breaker to be triggered, two devices operating according to different principles are usually employed in association: for low overloads, the one device employing the deformation of a bimetallic strip under the action of heating caused by passage of current, and for high overloads, the other device employing the magnetic flux engendered in coils in series in the terminal of the apparatus.

These systems have certain disadvantages however.

The regularity of the triggering times for a given overload depends largely on the stability of the bimetallic strip characteristics. These are however frequently affected by ageing due to the temperature variations they undergo. In addition, as each terminal protected comprises a bi-metallic element, it is necessary to schedule and perform separate adjustment for each terminal of the circuit breaker.

The circuit breakers should operate with a time lag whose limits should be complied with in the normal conditions of application, especially if the ambient temperature varies from 0° C. to 40° C., and the presence of the bimetallic elements and maximum rating coils moreover entails a rise in temperature within the housing which may differ very greatly depending on the setting calibration of the circuit breaker, thus making thermal compensation necessary.

The multiple calibration of the circuit breakers is generally established by shunting the main current, either at the terminals of the bimetallic elements, or at the terminals of the bimetallic element maximum coil assemblies, calculated for the lowest rating of the apparatus. The switching of these shunts, which should occur easily, however entails risks of decalibration owing to the introduction at the terminals of voltage drops which are difficult to control.

On the other hand, the electrical circuit breakers are increasingly used for causing the circuit to be protected to be opened as well if an imbalance occurs between the currents under control, so that one is impelled to form circuit breakers having several points of access to the elements assuring release.

It is a main object of the present invention to eliminate these shortcomings, by employing a relay control device adaptable to all types of relays.

Another object of the invention resides in the provision of a device for protection of electrical circuits against overloads whose response characteristics, in particular the operating delay as a function of overload, can be adjusted with great flexibility and substantially independently of the ambient temperature conditions.

A further object of the invention is to provide a combined device for protection against overloads and at the same time against other incidents such as failure currents to earth for example, this combined protection being obtained in a simpler and more economical manner than in the known devices.

According to the invention an electrical circuit protection device comprising a circuit breaker connected to a triggering relay which senses overloads, is characterized in that the energising coil of the said triggering relay is connected through an electronic threshold switch to the terminals of an electric reservoir element, supplied from at least one current transformer through a rectifier and a time delay circuit.

This arrangement of the protective device offers important new possibilities from two different points of view: in the first instance, it makes it possible to act with great flexibility on the response characteristics as a function of the magnitude of the overload, by a simple arrangement of the time delay circuit, specifically by the insertion into that circuit of appropriate non-linear elements; on the other hand, it lends itself very easily to a combination of protection against overloads and protection against imbalance, and even protection against incidents of any other type. To embody a combined protection of this nature, it is sufficient in fact for one or more other sources which apply to this reservoir element a signal generated as a result of the incidents from which one wishes to be protected, to be connected to the terminals of the reservoir element.

Figures 2, 3:
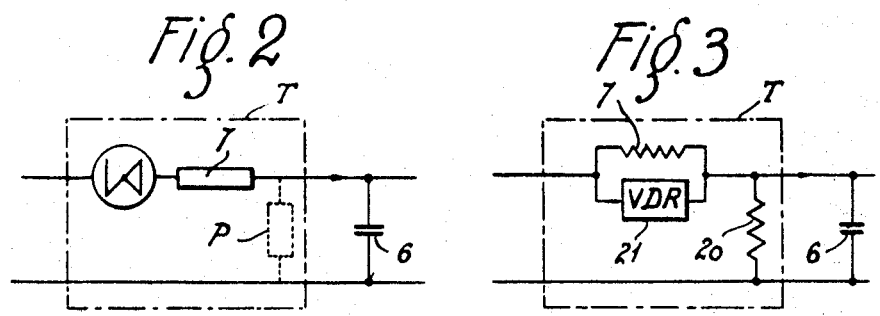
Figure 4:
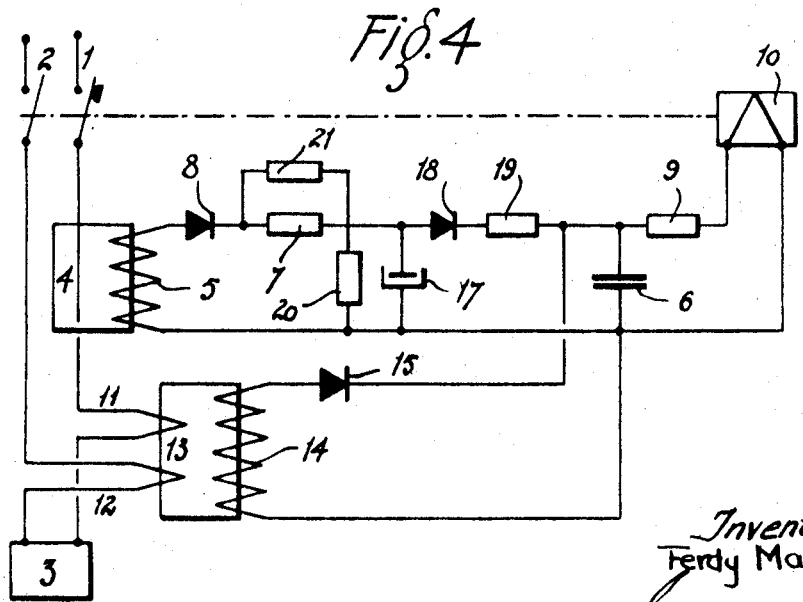
Figure 5:
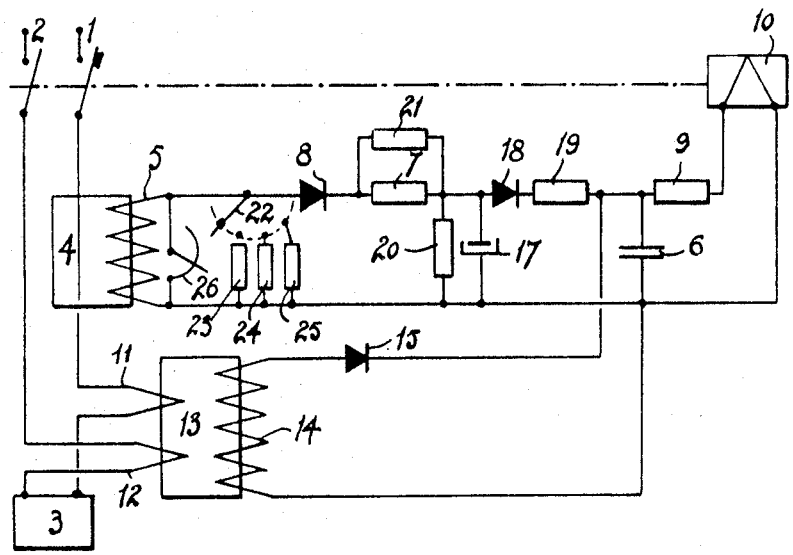
Figure 6:
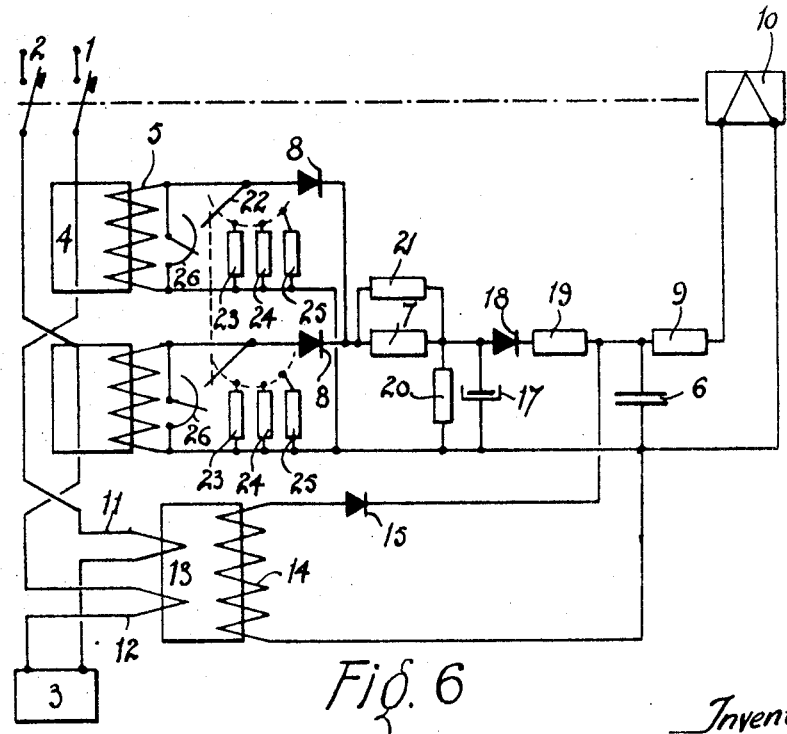

In order that the invention may be more clearly understood some embodiments thereof will now be described, by way of example, with reference to the accompanying drawings in which:

FIGURE 1 is a circuit diagram showing the principle of a device for protection against overloads according to the invention, FIGURES 2 and 3 show two arrangements of a time delay circuit forming a part of the circuit of FIGURE 1, FIGURE 4 shows a device for combined protection against overloads and against leakage currents to earth, FIGURE 5 shows a variant of the circuit of FIGURE 4, and FIGURE 6 illustrates the application of the invention to a polyphase installation.

Referring to the circuit diagram of FIGURE 1, a single-phase distribution grid 1, 2 feeds a load 3 through a circuit breaker D which interrupts the circuit when the current absorbed reaches an unacceptable value. A current transformer 4, interpolated in the line 1 for example, provides a supply from its secondary winding 5 to a reservoir condenser 6 through a time delay circuit T preceded by a rectifier 8. The time delay circuit referred to in detail below, is of the kind having a resistive series branch S and a parallel capacitative branch P. It is assumed for the purposes of FIGURE 1 that a simple resistor 7 forms the series branch and that the parallel branch P is reduced to the capacitance of the condenser 6.

A discharge circuit established at the terminals of the condenser 6 comprises a voltage threshold diode, illustrated diagrammatically at 9, in series with the energising coil 10 of the triggering relay of the circuit breaker D.

The transformer 4 is so designed that for a normal load current 3, the potential supplied by the secondary winding 5 remains lower than the conduction or release threshold of the diode 9. In case of excess potential, the voltage at the terminals of the condenser 6 rises progressively and reaches the priming threshold of the diode 9. The condenser then discharges into the relay 10 and causes the circuit breaker to open.

It is known that it is desirable to obtain a relatively prolonged time delay for low overloads and a prompt response to high overloads. In the devices known at present, thermal devices (bimetallic strips) are employed to ensure time delay for low overloads, whereas the prompt response for high overloads is assured by maximum response coils. Within the scope of the invention, the time delay circuit alone performs the function of regulating the time delay as a function of overload, by determining the loading conditions of the reservoir element formed by the condenser 6.

FIGURES 2 and 3 show two possible arrangements of the time delay circuit.

The circuit of FIGURE 2 is characterised by the insertion into the series branch of the time delay circuit of a threshold element such as a Zener diode 16: the threshold of this diode is set, for example, to a value corresponding to a load of 110% for example of the nominal—say $I_n$—current of the circuit breaker. The loading of the condenser 6 cannot in these conditions begin until this value is reached, and thereafter proceeds with a time constant determined by the remainder of the time delay circuit.

The circuit of FIGURE 3 is characterized by the fact that the series branch of the circuit comprises a linear resistor 7 shunted by a non-linear element 21 whose resistance decreases as the voltage applied across its terminals increases. An element of this kind may be formed by a Zener diode or—more economically—by a resistance of the VDR type for example. Here again, a time constant which varies with voltage is obtained, involving a reduction in the response period of the device in the case of substantial overload caused by inter-phase short circuiting for example.

On the other hand, one may obtain practically analogous triggering periods, independently of the intensity of the current established within the circuit prior to the instant at which overload appears. The release of the circuit breaker may in point of fact occur "from cold," that is to say that the triggering current set to $1.3I_n$ for example, may be applied suddenly: the condenser 6 (which until now plays the part of a reservoir element and at the same time that of a time delay condenser) is then charged at an accelerated rate throughout the time in which the resistance of the non-linear element 21 remains reduced by the voltage engendered at its terminals. This accelerated charging rate may continue until a loading potential is reached which for example corresponds to three-quarters or the whole of the nominal charge $I_n$. Beyond this value, the voltage across the terminals of the non-linear element 21 has become sufficiently weak for the latter to assume a high impedance. The rest of the charge is then slowed down, this last stage representing the essential time delay feature.

In the case in which $I=I_n$ however, only this second decelerated charging phase is involved, and practically the same degree of time delay is obtained as in the preceding case.

Generally, it is possible, by variations in the values or characteristics of the elements of the time delay circuit, to obtain a "shaping" of the triggering period curves as a function of overload for an installed circuit breaker; this is of importance if a problem exists in co-ordinating interruptions performed by several circuit breakers of one and the same protected installation.

The circuit of FIGURE 3 also includes a resistor 20 forming a leakage branch associated with the parallel branch of the time delay circuit. This leakage branch improves the performance of the device, specifically by preventing crest rectification and by reducing the effect of the possible variations of the leakage currents as a function of temperature and voltage, which may for its part admit the threshold diode 9 before its priming.

FIGURE 4 shows a combined protection device against overloads associated with a differential protection device against leaks to earth, of a type which is already known. Each feed wire 1, 2 includes a series winding respectively 11 and 12 performing the function of primary winding for a differential transformer 13. This transformer also comprises a secondary winding 14 which senses the differential flux due to the windings 11 and 12. This winding 14, through a rectifier 15, charges the reservoir element formed by the condenser 6. The capacitative time delaying function is assured in this instance by a separate condenser 17, a diode-oriented coupling is assured by a diode 18, and a resistance 19 is incorporated between the time delaying condenser 17 and the reservoir condenser 6.

This arrangement firstly gives the advantage that the capacitance of the reservoir condenser 6 may remain low. This allows rapid operation which is always desirable in the case of failure currents to earth. The capacitance of the time delaying condenser 17 may for example be fifty times greater than that of the condenser 6, this making it possible to effect very considerable reduction of the resistance 7, so that the layout is much less sensitive to temperature. The presence of the diode 18 prevents the differential protection device from charging the condenser 17 and thus from influencing the time delay of the protection against overloads. On the other hand, the resistance 19 limits the discharge current of the condenser 17 into the energising coil of the relay 10 when the diode 9 becomes conductive.

The different variants of the overload protection device associated with a differential protection device or not have been described only for a given nominal current. One may easily establish multicalibration of the schemes proposed, for example: voltage tappings on the secondary of the transformer 5, variation of the width of a gap, shunts on the primary windings, or shunts on the secondary winding.

This last solution, which is of particular interest, is illustrated in FIGURE 5.

A switch 22 comprising a dead contact for base calibration, makes it possible to position on the terminals of the secondary winding 5 miniature resistances of low rating such as 23, 24, 25, each corresponding to a different rating, the resistance having values of the order of a thousand ohms and allowing a weak flow; the contact resistances due to switching being relatively insignificant.

In addition, this way of obtaining multicalibration makes it possible, by means of a small potentiometer 26 itself shunting the secondary winding 5 of the current transformer, to perform setting allowing for the different thresholds and for the different initial leakage currents of the voltage threshold diodes 9.

It is quite evident that these different arrangements may be adapted easily to a polyphase system, for example a two-phase system, as illustrated in FIGURE 6.

An element sensing current intensity, such as the transformers 4, is incorporated in each phase, 1 and 2. The secondary voltages are rectified by the rectifiers 8 before being applied in parallel to a circuit of the kind previously described. Each phase has its independent regulating element 26, and the switches 22 are then gauged in such manner as to obtain the same regulation setting for all the phases protected.

In addition to the extent in which the current transformers 4 have identical output characteristics, either by virtue of design, or of selection after construction, it is possible to simplify the preceding arrangement by employing only one regulating element 26 and a single set of resistances 23, 24, 25, then positioned after the common point of connection of the diodes 8.

A single adjustment may then be assured although the apparatus may be multipolar.

The invention is not limited to the embodiments described and illustrated. By employing conventional layouts, one may in particular cause the device to react to other parameters such as under-intensity, overvoltage or undervoltage.

I claim:

1. An electrical circuit protection device comprising a circuit breaker connected to a triggering relay which senses overloads, an electrical reservoir element, an electronic threshold switch connecting the energising coil of the triggering relay to the terminals of the reservoir element, a first supply circuit for applying an overload signal to the reservoir element including at least one current transformer connected to the reservoir element through a rectifier and a time delay circuit, and a second supply circuit connected in parallel with the first supply circuit to the terminals of the reservoir element for applying to the reservoir element a signal protecting against failure currents to earth, said second supply circuit comprising a differential transformer and a rectifier.

2. A combined electrical circuit protection device according to claim 1, characterised in that the time delay circuit includes a condenser separate from the reservoir element, and in that a diode-oriented coupling is established between the time delay circuit and the reservoir element.

3. A device according to claim 1, characterised by variable shunts positioned at the terminals of the secondary winding of the current transformers in order to permit multiple calibration.

4. A device according to claim 3, characterised in that the variable shunts are established by the connection in parallel of a continuously regulatable potentiometer with a series of fixed shunts combined with a contact selector.

5. A device according to claim 4, for application to a polyphase system, characterised by a single variable shunt for the current transformers of the different phases, this shared shunt being connected to the corresponding secondaries of the said transformers through diode-oriented connections.

References Cited

UNITED STATES PATENTS

| 3,018,356 | 1/1962 | Busch et al. | 317—33 X |
| 3,105,920 | 10/1963 | Dewey | 317—33 X |
| 3,153,747 | 10/1964 | Sofianek et al. | 317—36 |

JOHN F. COUCH, Primary Examiner

J. D. TRAMMEL, Assistant Examiner

U.S. Cl. X.R.

317—36, 151